(12) United States Patent
Hassed

(10) Patent No.: US 7,101,135 B2
(45) Date of Patent: Sep. 5, 2006

(54) SELF-ALIGNING NUT PLATE

(75) Inventor: David W. Hassed, Lexington Park, MD (US)

(73) Assignee: Bell Helicopter Textron, Inc., Hurst, TX (US)

( * ) Notice: Subject to any disclaimer, the term of this patent is extended or adjusted under 35 U.S.C. 154(b) by 59 days.

(21) Appl. No.: 10/410,747

(22) Filed: Apr. 9, 2003

(65) Prior Publication Data

US 2004/0013495 A1    Jan. 22, 2004

Related U.S. Application Data

(60) Provisional application No. 60/397,008, filed on Jul. 19, 2002.

(51) Int. Cl.
   *F16B 37/08*   (2006.01)
(52) U.S. Cl. ............... 411/432; 411/111; 411/537; 411/112
(58) Field of Classification Search .......... 411/111, 411/112, 113, 174, 175, 432, 537; 416/134 A, 416/141, 148, 149
   See application file for complete search history.

(56) References Cited

U.S. PATENT DOCUMENTS

| 2,243,923 | A | * | 6/1941 | Swanstrom | 411/113 |
|---|---|---|---|---|---|
| 2,409,209 | A | * | 10/1946 | Johnson | 411/111 |
| 2,820,499 | A | * | 1/1958 | Schaaf | 411/103 |
| 3,020,946 | A | * | 2/1962 | Mills | 411/85 |
| 3,123,120 | A | * | 3/1964 | Grimm et al. | 411/111 |
| 3,135,154 | A | * | 6/1964 | Zenzic | 411/12 |
| 3,163,198 | A | * | 12/1964 | Zahodiakin | 411/112 |
| 3,328,095 | A | * | 6/1967 | Nowselski et al. | 384/207 |
| 3,765,078 | A | * | 10/1973 | Gulistan | 411/112 X |
| 4,263,831 | A | * | 4/1981 | Smith | 411/171 |
| 4,826,374 | A |   | 5/1989 | Baglin |  |
| 4,830,557 | A | * | 5/1989 | Harris et al. | 411/113 |
| 5,071,279 | A |   | 12/1991 | Rustrom |  |
| 5,137,406 | A | * | 8/1992 | Cosenza | 411/113 |
| 5,145,132 | A |   | 9/1992 | Kirschner |  |
| 5,193,868 | A |   | 3/1993 | O'Toole |  |
| 6,183,180 | B1 | * | 2/2001 | Copple et al. | 411/107 |
| 2003/0129041 | A1 | * | 7/2003 | Mitts et al. | 411/171 |

* cited by examiner

*Primary Examiner*—Katherine Mitchell
(74) *Attorney, Agent, or Firm*—Pillsbury Winthrop Shaw Pittman LLP

(57) ABSTRACT

A nut assembly includes a base plate and a nut. The base plate includes a bearing surface with bore for the passage of a bolt or the like therethrough. The nut includes a bearing surface engaged with the bearing surface of the base plate. The said nut includes a bore engageable with a bolt or the like passing through the bore of the base plate. The base plate may include foot members disposed around the bore of the base plate.

24 Claims, 13 Drawing Sheets

SELF-ALIGNING NUT PLATE

CROSS-REFERENCE TO RELATED APPLICATION

The present application claims the benefit of Provisional Application No. 60/397,008, filed Jul. 19, 2002, and titled SELF-ALIGNING NUT PLATE.

FIELD OF THE INVENTION

The present invention relates generally to fasteners and more specifically to a self-aligning nut plate for installation on contoured surfaces.

BACKGROUND OF THE INVENTION

One of the most common mechanical fastening methods is the bolted joint. In this type of joint, a first object and a second object are pulled together by means of an externally-threaded bolt mated to an internally-threaded nut. Generally, the bolt passes through a hole in each of the two objects, with the inner face of the bolt head seating against the outer surface of one of the objects and the inner face of the nut seating against the outer face of the remaining object. Often, a washer will be placed under either one or both of the bolt head and/or nut in order to protect the surface of the objects.

The bolted joint has enjoyed a great deal of success as a fastening method, and has been employed in all manner of mechanical devices and structures. Where a bolted joint is anticipated as the preferred method of attachment, one or both of the objects to be secured together will be "counter-bored" or "spot-faced" on one or both of the faces mating with the bolt and nut so as to provide a pair of flat, parallel surfaces suitable for maximum mechanical integrity.

One rationale behind the counter-boring and spot-facing operations is that bolts are generally very strong in pure tension. As bending loads are imparted to a bolt, however, strength may be reduced. While pure tension loading imparts a uniform stress across the cross-sectional area of the bolt, bending load represents a concentration of tensile load on one side of the bolt, and a corresponding concentration of compressive loading on the opposite side. In severe cases of misalignment, a bolt may experience a sufficient bending load that mechanical failure occurs.

In order to prevent the impartation of bending load to mechanical fasteners, a number of methods have been devised for creating and maintaining a parallel geometry. These methods include the introduction of shims in between the fastener head and a non-parallel surface in order to create a parallel geometry. Each of these methods has a number of drawbacks. For example, where shims are used, there is the potential that one or more shims may come loose at an inopportune time. Further, the use of shims requires that maintenance personnel maintain extremely close attention to the type and number of shims used during disassembly and reassembly.

SUMMARY OF THE INVENTION

The present invention provides a nut assembly incorporating a base plate having a planar surface, a central bore through the planar surface, a spherical bearing surface disposed around the central bore and a plurality of feet disposed about the central bore. The nut assembly also includes a captive nut having a bolt hole in the center thereof and a bearing surface having a spherical profile. The captive nut is held in engagement with the spherical bearing surface of the base plate.

More particularly, the present invention may provide a nut assembly incorporating a generally-triangular base plate having a planar top surface, a planar bottom surface, and a central bore passing from the top surface to the bottom surface. The base plate has a bearing surface, having a spherical profile, disposed around the top edge of the central bore, and three feet, each of which is disposed about the central bore at one corner of the generally-triangular base plate. The nut assembly also includes a captive nut, disposed on the top side of the base plate, having a bore through the center thereof, and a bearing surface, having a spherical profile, disposed against the bearing surface of the base plate.

The present invention may provide a nut assembly incorporating a cage having a substantially-planar top surface, a central fastener bore, and three outboard feet, disposed regularly about the central fastener bore. The nut assembly incorporates a seat washer having a substantially-planar bottom surface, disposed against the top surface of the cage, and an inner bearing surface having a spherical profile. The nut assembly incorporates a captive nut having a central fastener hole and a lower bearing surface having a spherical profile. Finally, the nut plate assembly incorporates a lock ring, disposed against a top surface of the captive nut so as to retain the captive nut within the cage.

DETAILED DESCRIPTION OF THE PREFERRED EMBODIMENTS

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention and do not delimit the scope of the invention.

Figure 1:
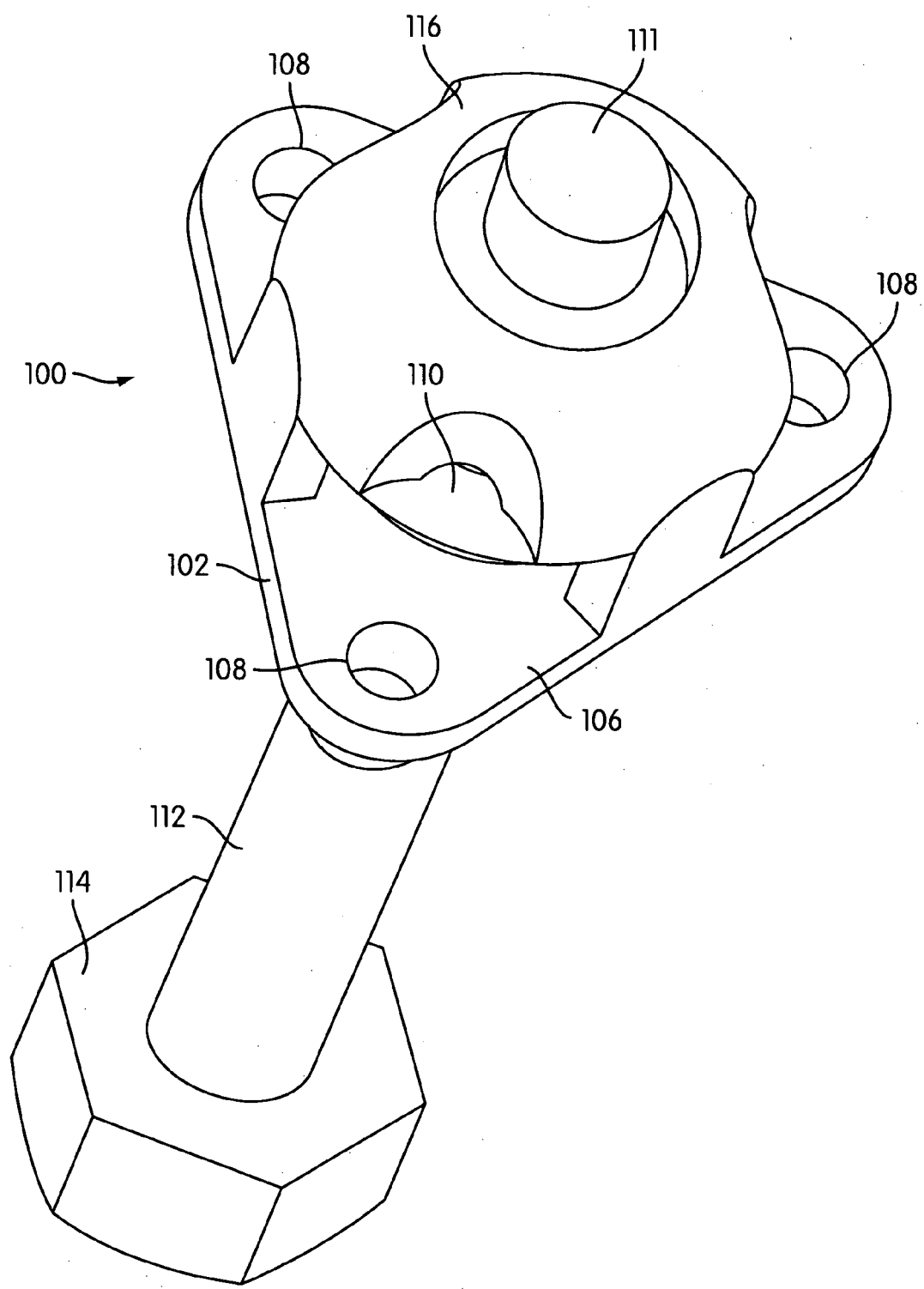
FIG. 1 is a perspective view of a nut plate and bolt assembly in accordance with one embodiment of the present invention.
Figure 2:
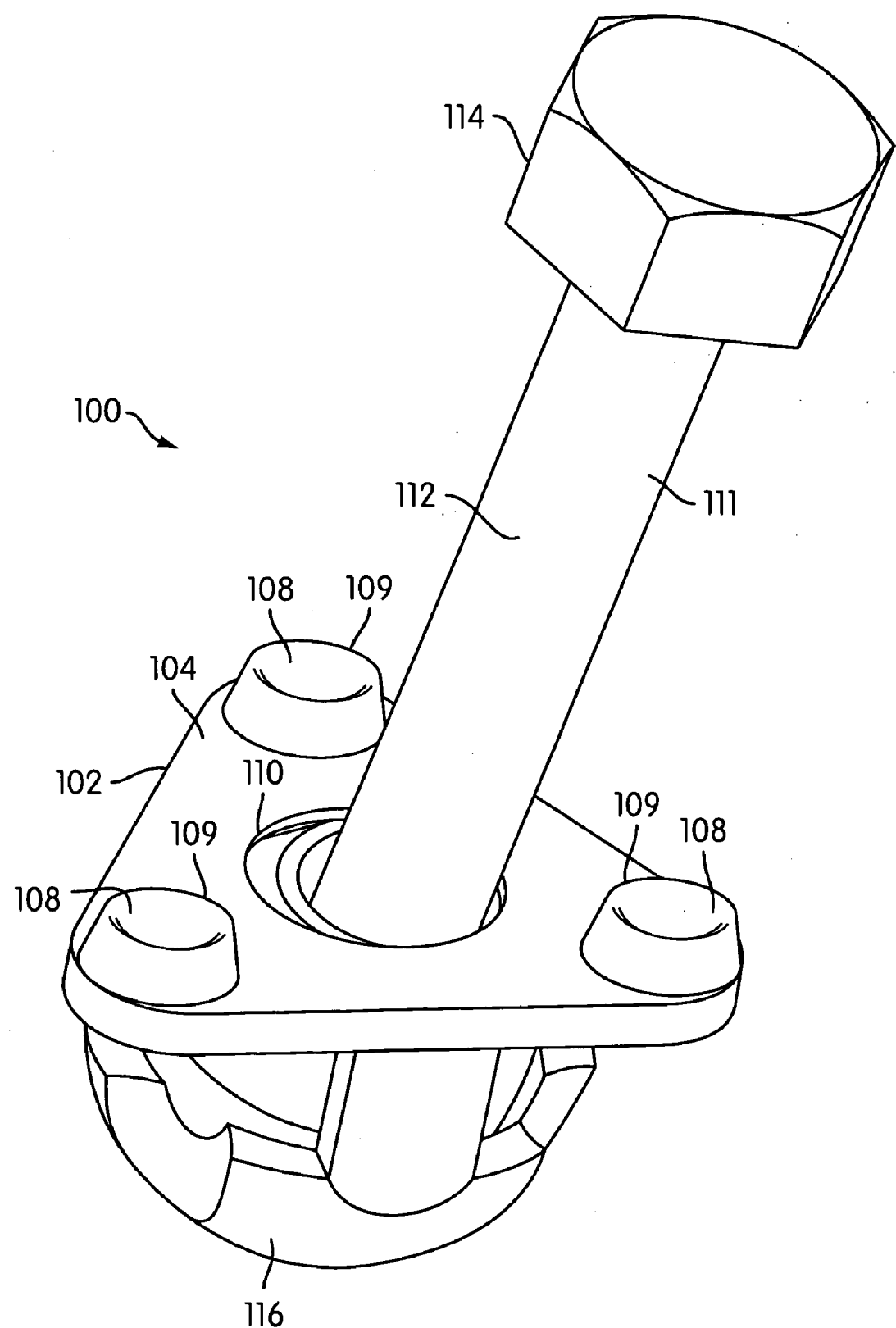
FIG. 2 is a perspective view of a nut plate and bolt assembly in accordance with one embodiment of the present invention.
Figure 3:
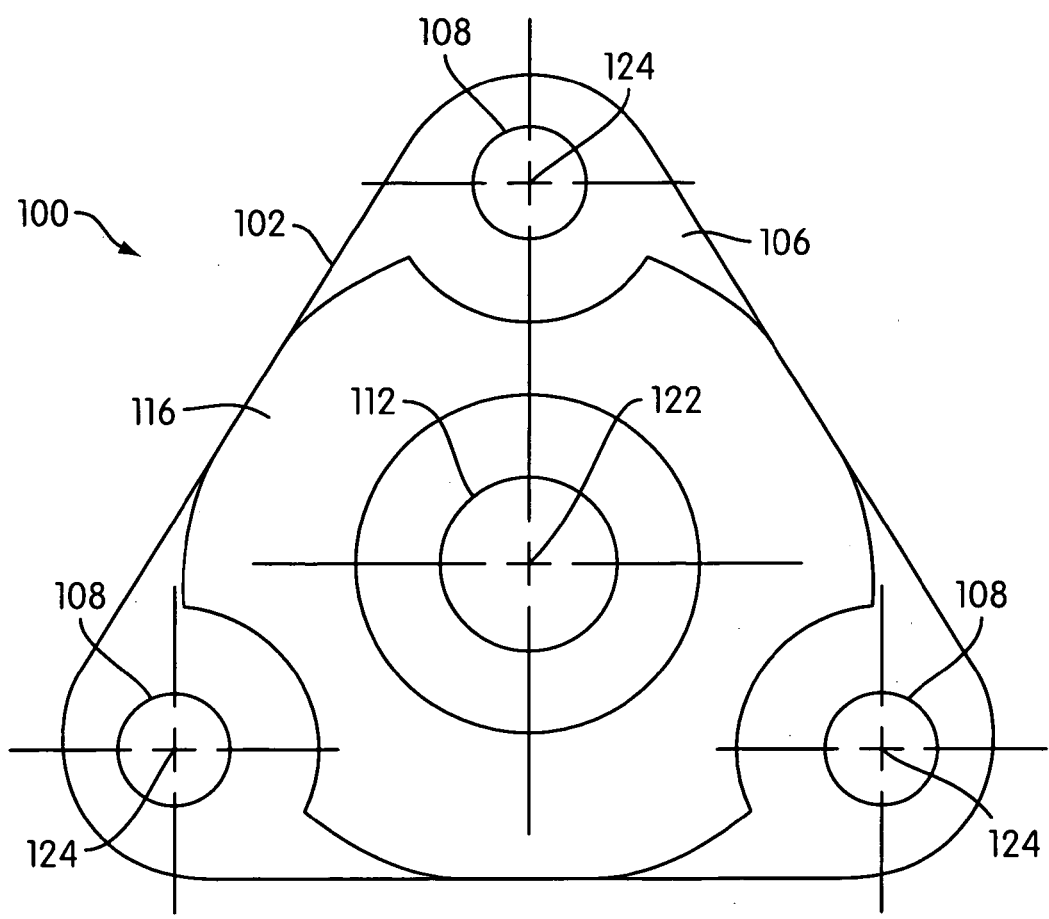
FIG. 3 is a top view of a nut plate in accordance with one embodiment of the present invention.
Figure 4:
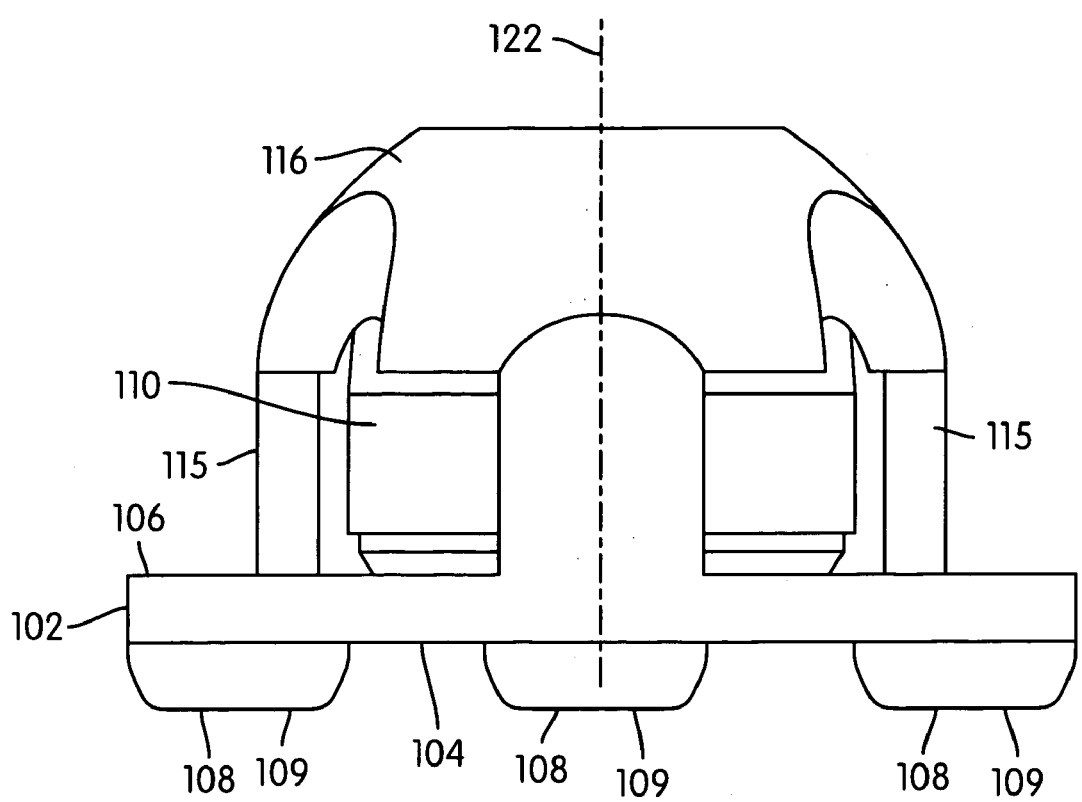
FIG. 4 is a side view of a nut plate in accordance with one embodiment of the present invention.
Figure 5:
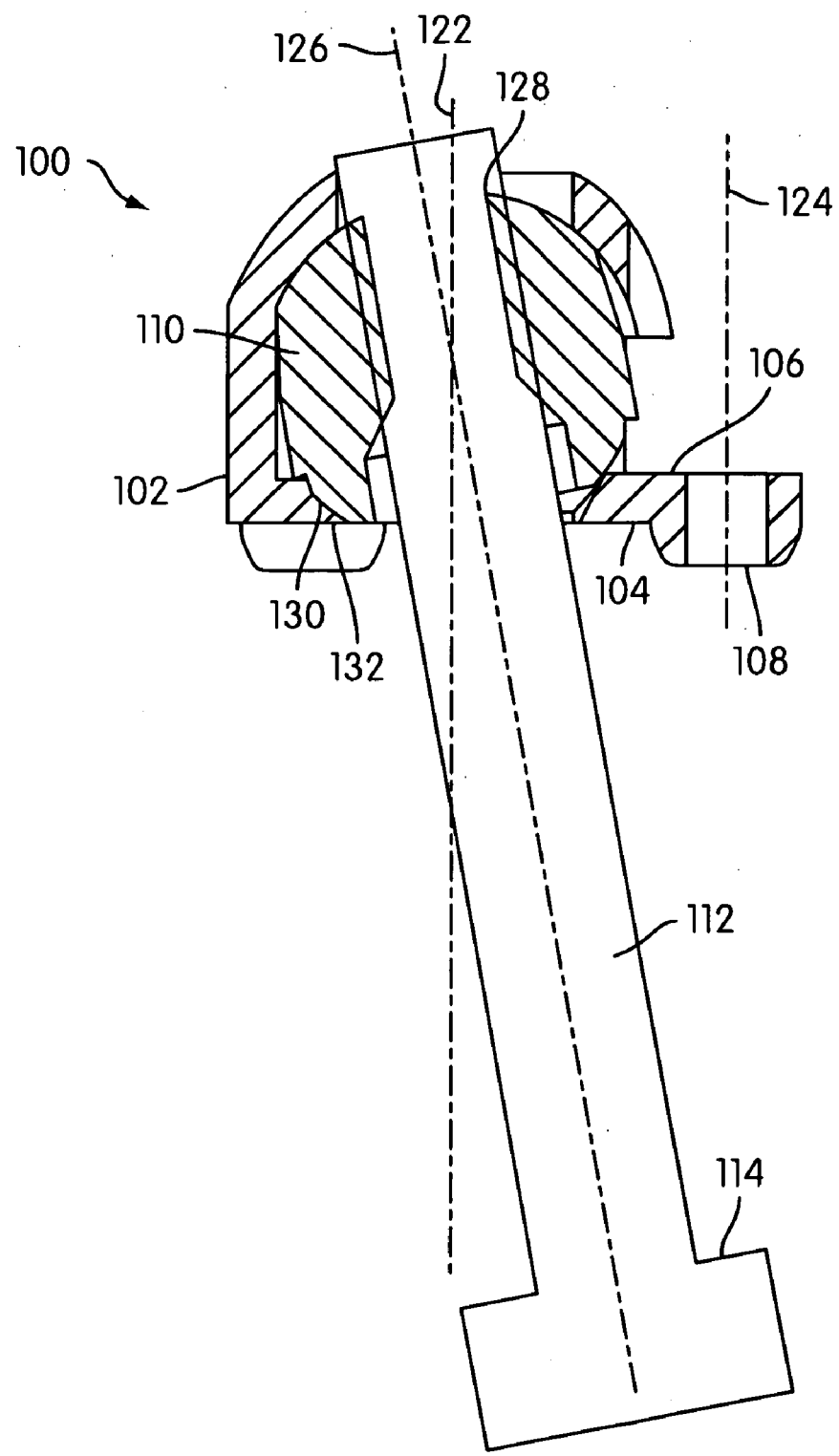
FIG. 5 is a side section view of a nut plate and bolt assembly in accordance with one embodiment of the present invention.

FIGS. 1 and 2 are perspective views of a nut plate assembly 100 in accordance with one embodiment of the present invention. FIGS. 3, 4, and 5 are top, side, and side section views, respectively, of the nut plate assembly of FIGS. 1 and 2. Nut plate assembly 100 incorporates a generally-triangular base plate 102 having a substantially planar bottom surface 104 and a substantially planar top surface 106 substantially parallel to bottom surface 104. Disposed in the center of the base plate 102 is a central bore 107 having a central axis 122 extending substantially orthogonally to the planes of bottom surface 104 and top surface 106.

At each corner of the base plate 102, a fastener hole 108 passes through the base plate 102, along a central axis 124 extending substantially orthogonally to the planes of bottom surface 104 and top surface 106. A raised foot 109 protrudes from the bottom surface 104 around each of the fastener holes 108. Together, these three raised feet 109 provide three supports for stable registration against three points on either a planar or a non-planar surface. A captive nut 110 is disposed within the center of the nut plate assembly 100. Captive nut 110 has a threaded hole 128 in the center, for retention of a portion of a fastener, such as the shank 112 of bolt 111. Head 114 of bolt 111 is of a common type having a hexagonal shape and a size larger than the cross-sectional diameter of shank 112, but a variety of fasteners may be used in place of bolt 111 without departing from the spirit and scope of the present invention.

Captive nut 110 is held in place between the base plate 102 and a nut cage 116. A set of three nut cage supports 115, extending from the sides of the base plate 102, connect the base plate 102 and the nut cage 116. In the design shown in FIGS. 1–5, the nut cage 116 has a hemispherical outer profile, but this shape may vary depending on the application without departing from the spirit and scope of the present invention.

As seen most clearly in FIG. 5, although the captive nut 110 is held in place between base plate 102 and nut cage 116, it has a partially-spherical outer profile, so that it is relatively free to rotate about its center point, which lies on or near the central axis 122 of the central bore 107 in the base plate 102. As can be seen in FIG. 5, the central axis 126 of the captive nut 110 may be disposed at a significant angle to central axis 122. In one embodiment, an angle as large as 10 degrees may be accommodated. As the bolt 111 is tightened into the threaded hole 128 in captive nut 110, the captive nut bearing surface 130 is brought into engagement with base plate bearing surface 132, both of which follow a spherical profile. As the captive nut bearing surface 130 begins to exert force against base plate bearing surface 132, the raised feet 109 exert force on the surface (not shown) against which the nut plate assembly 100 is seated, thereby securing the assembly.

With the above-described arrangement, the generally triangular shape of the nut plate assembly 100 allows for a three-point contact against a contoured or non-planar surface. These three points establish a plane against which the nut plate assembly 100 securely registers. With this type of nut plate assembly 100, it is possible to install fasteners on contoured surfaces without any necessity for shimming during the installation process. Nut plate assembly 100 also allows the mounting of components having flat bases against contoured surfaces without special provisions for mounting fasteners not normal to the contoured surface.

Figure 6:
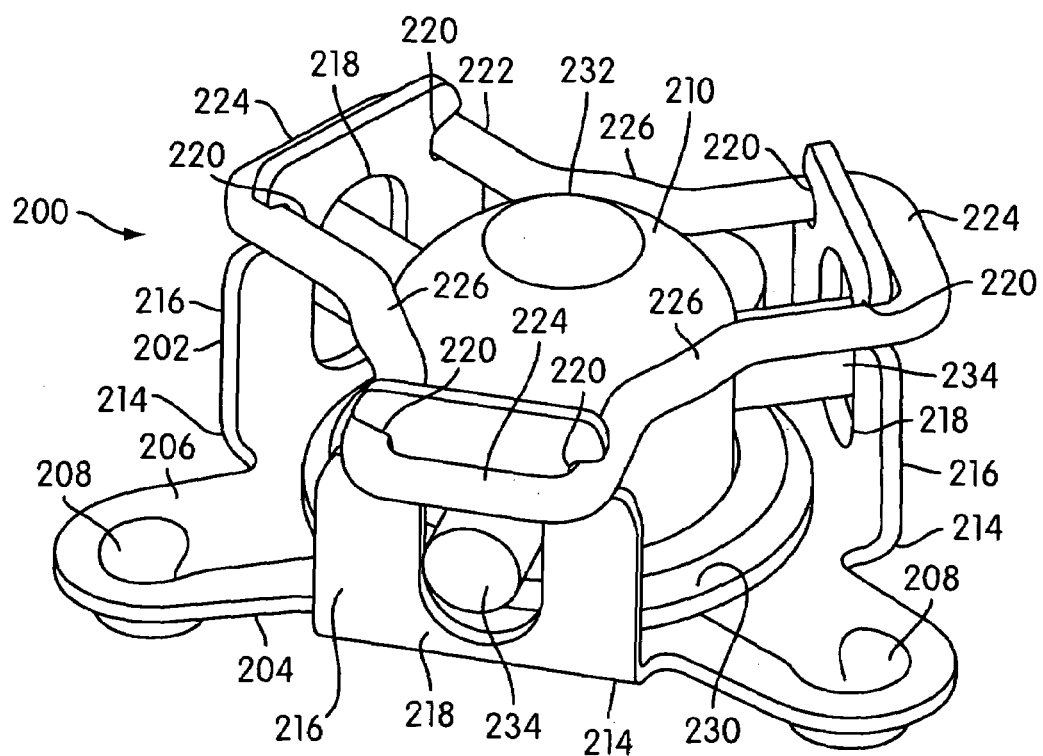
FIG. 6 is a perspective view of a nut plate assembly in accordance with a second embodiment of the present invention.
Figure 7:
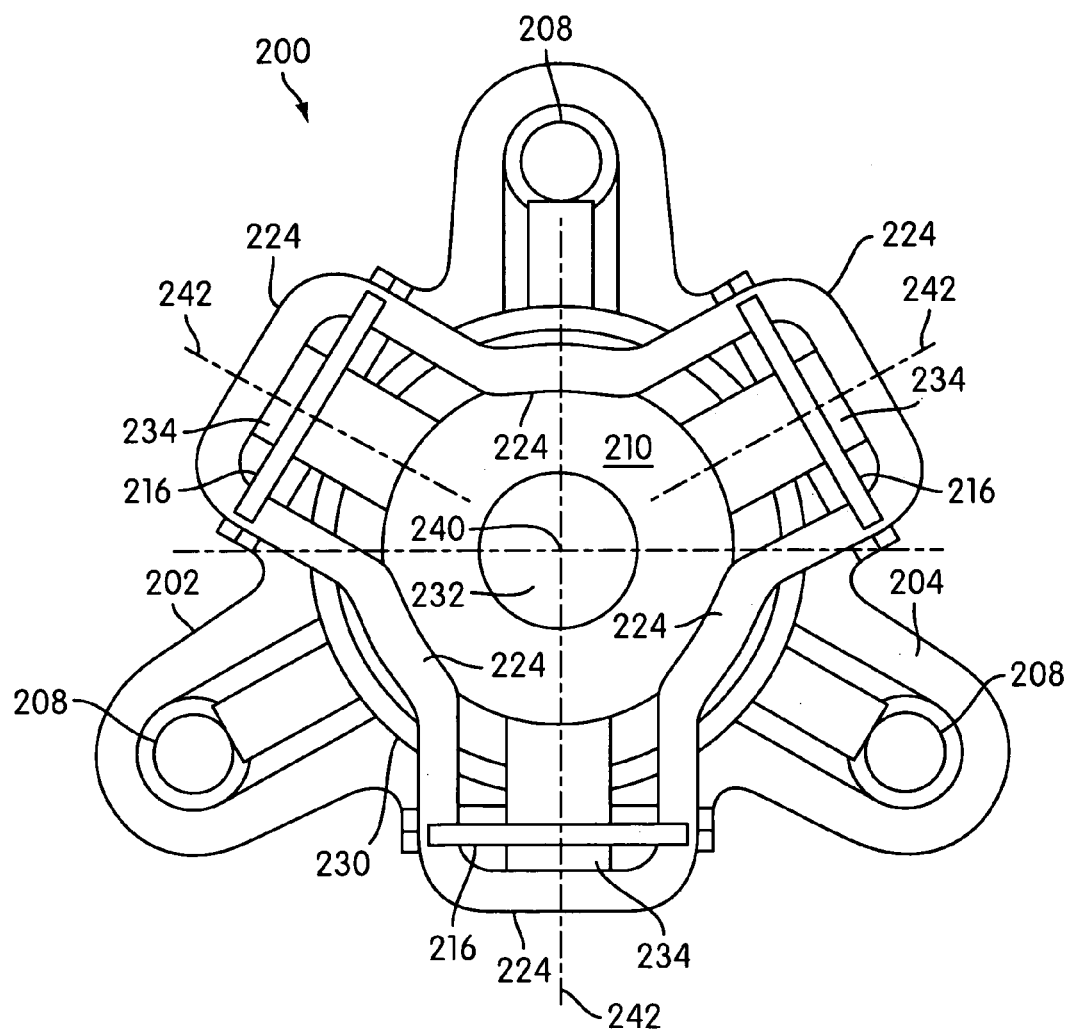
FIG. 7 is a top view of a nut plate assembly in accordance with a second embodiment of the present invention.
Figure 8:
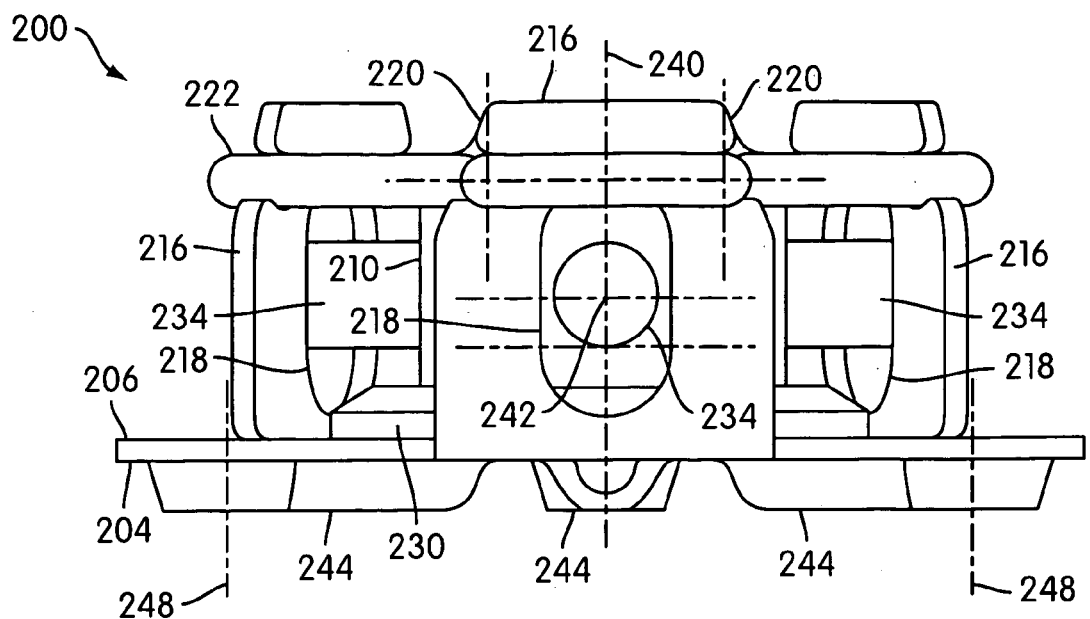
FIG. 8 is a side view of a nut plate assembly in accordance with a second embodiment of the present invention.
Figure 9:
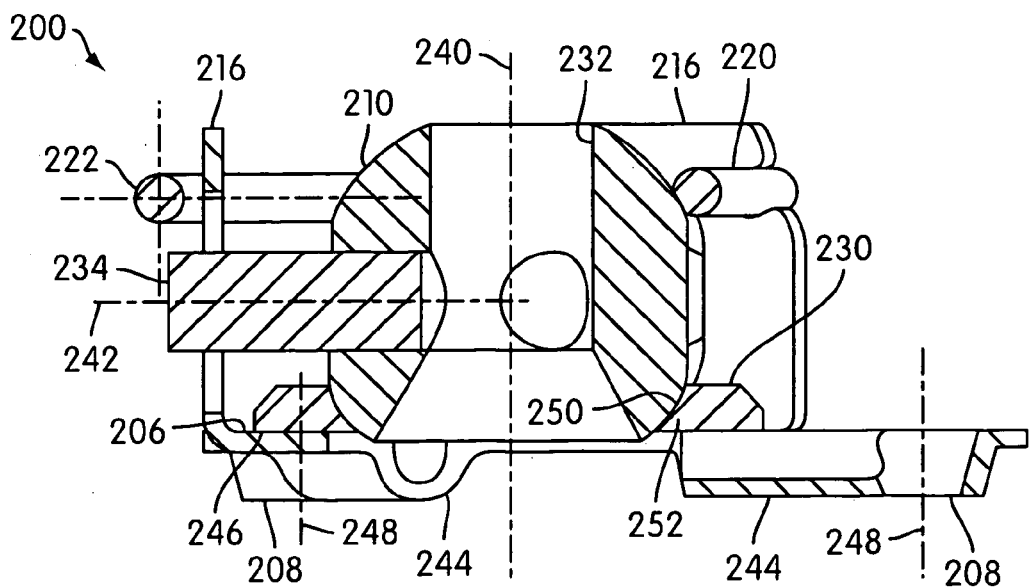
FIG. 9 is a side section view of a nut plate assembly in accordance with a second embodiment of the present invention.

FIG. 6 is a perspective view of a nut plate assembly in accordance with a second embodiment of the present invention. FIGS. 7–9 are top, side and side section views of the nut plate assembly of FIG. 6 in accordance with a second embodiment of the present invention. Nut plate assembly 200 is constructed of a nut plate cage 202 containing a captive nut 210 seated against a seat washer 230 and retained by a lock ring 222 having a y-shape.

Nut plate cage 202 incorporates a base portion having a substantially-planar bottom surface 204, a substantially-planar top surface 206, and three fastener bores 208, each disposed about a bore axis 248. In one embodiment, the bore axes 208 lie in separate planes coincident with the principal axis 240 of the central bore (not shown) and disposed at 120 degrees to one another. Adjacent to each of the three fastener bores 208 is a foot 244 extending from the fastener bore 208 toward the center of the nut plate cage 202. Feet 244 are designed to be relatively readily-deformable, in order to conform to the surface against which the nut plate assembly 200 is secured.

The nut plate cage 202 has a central bore (not shown) in the bottom thereof to allow for passage of a central fastener through the bottom of the nut plate cage 202. This bore extends along the principal axis 240 extending from the center of the nut plate cage 202 and generally orthogonally to the planes of the bottom surface 204 and top surface 206.

At three edges of the base portion, a set of bends 214 transition into three substantially-planar cage sides 216 having inner and outer surfaces disposed substantially orthogonally to the bottom and top planes 204 and 206 of the lower portion of cage 202. In or near the center of each side is a cutout 218. At the top of each cage side 216, there is a pair of shoulders 220 shaped and sized to receive a portion of the ring loops 224 of the lock ring 222. The inner portions of the lock ring 222 incorporate retaining segments 226, which register against the top surface of the captive nut 210, preloading it against the seat washer 230.

The captive nut 210 has a hole 232 down its center for accommodation of a fastener (not shown). Depending on the application, the fastener may engage the hole by means of threads, or may be attached by other means. As with nut plate assembly 100 shown in FIGS. 1–5, captive nut 210 is held in place by lock ring 222, but is free to rotate around its center point through a limited range of motion due to the employment of mating surfaces having spherical profiles. The range of motion of the captive nut 210 is limited in part by locking pins 234 extending outward from captive nut 210 and through cutouts 218 in cage sides 216 along pin axes 242. In the embodiment shown in FIGS. 6–9, the pin axes 242 are disposed at approximately 120 degrees to one another. As the captive nut 210 is rotated about an axis, locking pins 234 move within cutouts 218 until the motion of one or more of locking pins 234 is impeded by the edge of the cutout 218 within which it moves.

As seen in FIG. 9, the bottom bearing surface 250 of captive nut 210 seats against inner bearing surface 252 of the seat washer 230. The bottom surface 246 of seat washer 230 rests on the top surface 206 of the nut plate cage 202, but is free to slide across the top surface 206, so as to accommodate a certain degree of radial misalignment.

Figure 10:
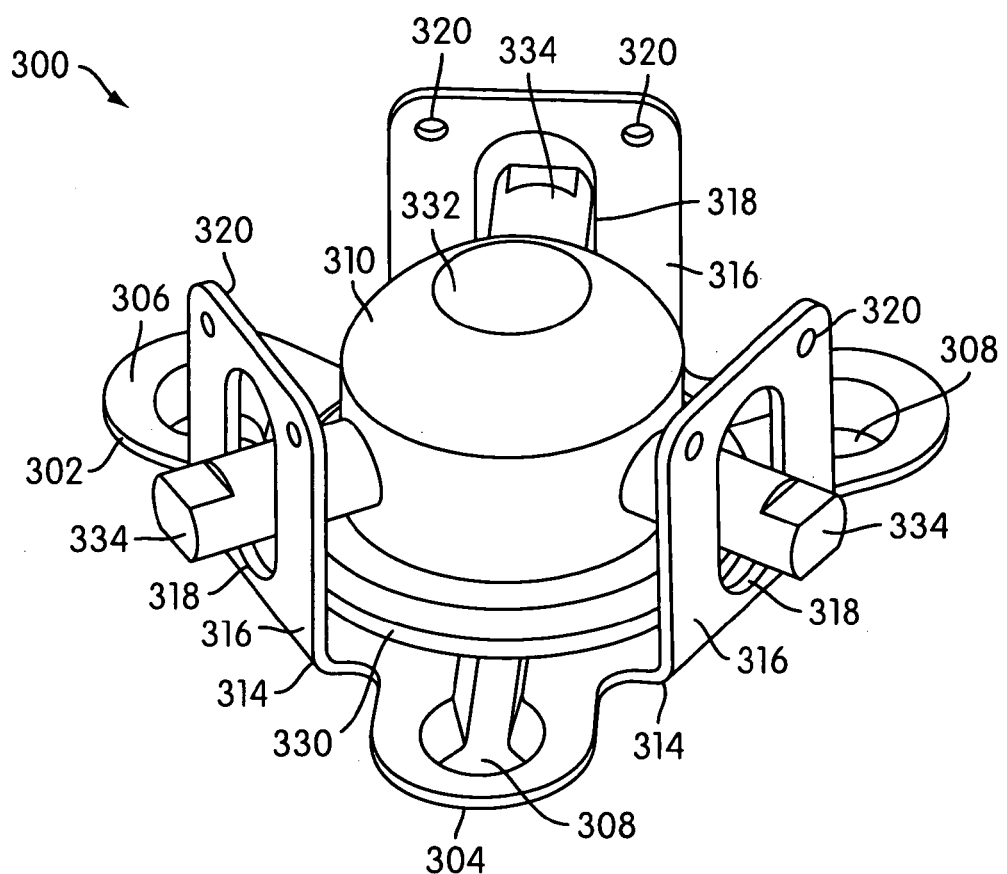
FIG. 10 is a perspective view of a third embodiment of the present invention.
Figure 11:
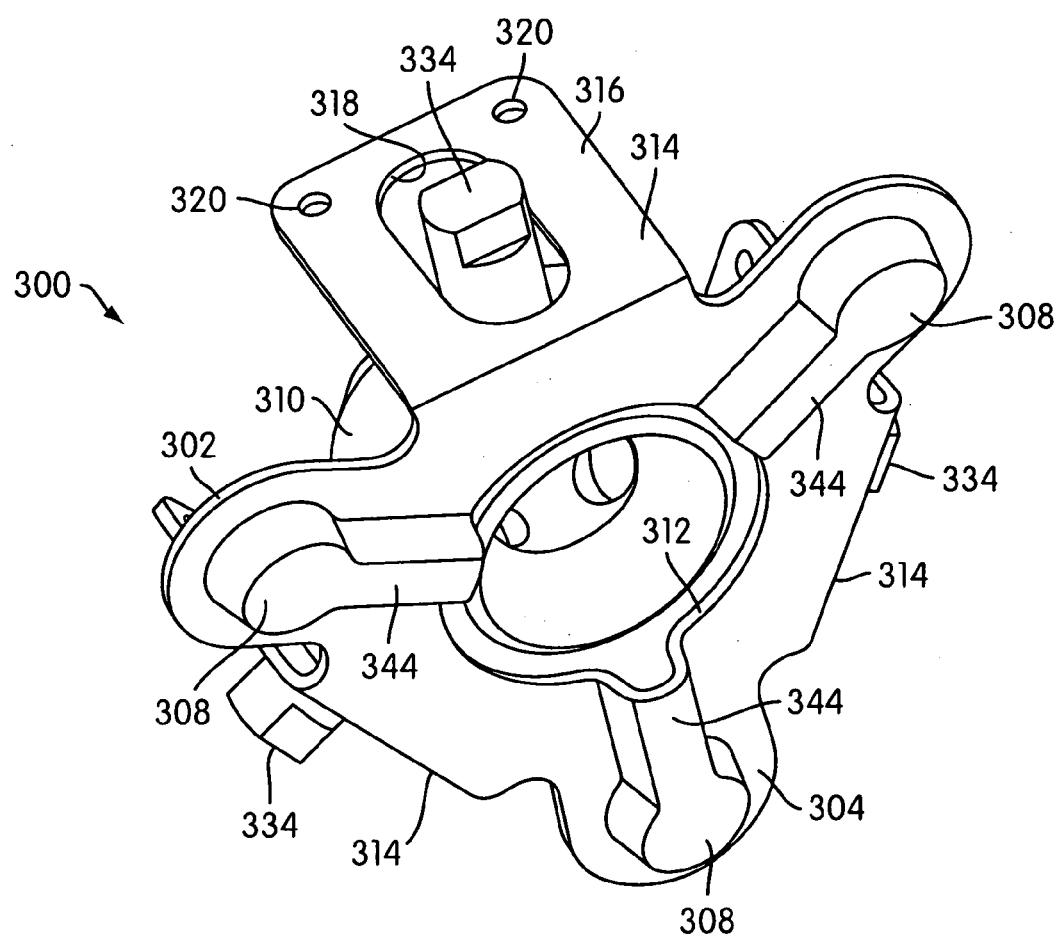
FIG. 11 is a second perspective view of the embodiment shown in FIG. 10.

FIG. 10 is a perspective view of a third embodiment of the present invention. FIG. 11 is a second perspective view of the embodiment shown in FIG. 10. Nut plate assembly 300 is constructed of a nut plate cage 302 containing a captive nut 310 seated against a seat washer 330.

Nut plate cage 302 incorporates a base portion having a substantially-planar bottom surface 304, a substantially-planar top surface 306, and three feet 308. In one embodiment, the centers of the feet 308 lie in separate planes coincident with the principal axis of the nut plate cage 302 and disposed at 120 degrees to one another. Adjacent to each of the three feet 308 is a ridge 344 extending from the foot 308 toward the center of the nut plate cage 302. In certain embodiments, ridges 344 are designed to be relatively readily-deformable, in order to conform to the surface against which the nut plate assembly 300 is secured.

The nut plate cage 202 has a central bore 312 in the bottom thereof to allow for passage of a central fastener through the bottom of the nut plate cage 302. This bore extends along a principal axis extending from the center of the nut plate cage 302 and generally orthogonally to the planes of the bottom surface 304 and top surface 306.

At three edges of the base portion, a set of bends 314 transition into three substantially-planar cage sides 316 having inner and outer surfaces disposed substantially orthogonally to the bottom and top planes 304 and 306 of the lower portion of cage 302. In or near the center of each side is a cutout 318. At the top of each cage side 316, there is a pair of safety wire holes 320 shaped and sized to receive a portion of a safety wire (not shown).

The captive nut 310 has a hole 332 down its center for accommodation of a fastener (not shown). Depending on the application, the fastener may engage the hole 332 by means of threads, or may be attached by other means. Captive nut 310 is held in place by locking pins 334, but is free to rotate around its center point through a limited range of motion due to the employment of mating surfaces having spherical profiles. The range of motion of the captive nut 310 is limited in part by locking pins 334 extending outward from captive nut 310 and through cutouts 318 in cage sides 316. In the embodiment shown in FIGS. 10–11, the axes of locking pins 334 are disposed at approximately 120 degrees to one another. As the captive nut 310 is rotated about an axis, locking pins 334 move within cutouts 318 until the motion of one or more of locking pins 334 is impeded by the edge of the cutout 318 within which it moves.

Figure 12:
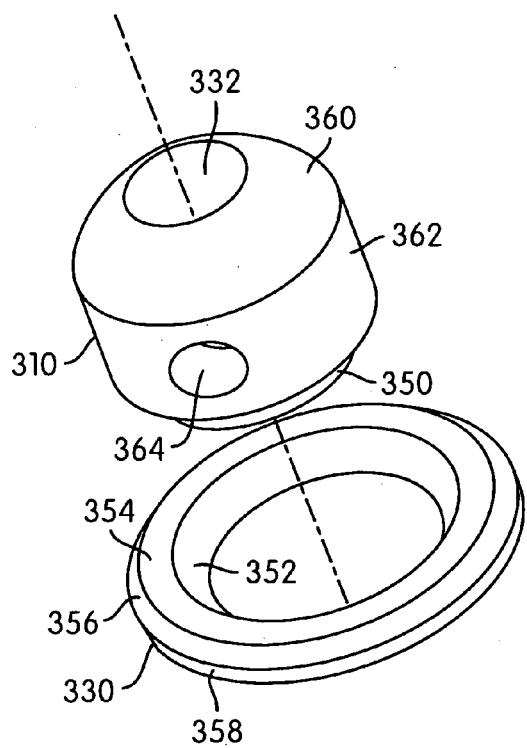
FIGS. 12 and 13 are perspective views of a seat washer and captive nut subassembly according to certain embodiments of the present invention.
Figure 13:
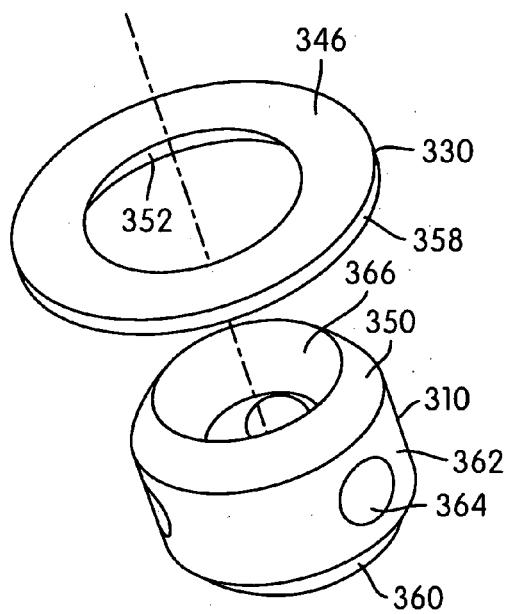

FIGS. 12 and 13 are exploded perspective views of a seat washer and captive nut subassembly according to certain embodiments of the present invention. As seen in FIGS. 12 and 13, seat washer 310 is defined by a substantially-planar washer bottom surface 346, a spherical washer inner bearing surface 352, a substantially-planar washer upper surface 354, a substantially-conical washer outer chamfer 356, and a substantially-cylindrical washer outer surface 358.

Captive nut 330 is defined by a substantially-cylindrical central bore 332, a spherical lower bearing surface 350, a substantially-spherical upper surface 360, a substantially-cylindrical outer surface 362, three substantially-cylindrical locking pin bores 364, and a substantially-conical chamfer 366. Each of the locking pin bores 364 is profiled to mate with a locking pin 334. In certain embodiments, the locking pins 334 may be retained in the locking pin bores 364 by threads, while other embodiments may make use of an interference fit or some form of adhesive.

As can be seen in FIGS. 12 and 13, lower bearing surface 350 of the captive nut 310 interfaces with, and is supported by, inner bearing surface 352 of the seat washer 330. The bottom surface 346 of the seat washer 330, in turn, interfaces with, and is supported by, upper surface 306 of the nut cage 302 of nut plate assembly 300 shown in FIGS. 10 and 11. With this design, the nut plate assembly 300 is able to accommodate angular misalignment through the spherical interface between captive nut 310 and seat washer 330, as well as radial misalignment through the planar interface between the seat washer 330 and the nut cage 302.

Figure 14:
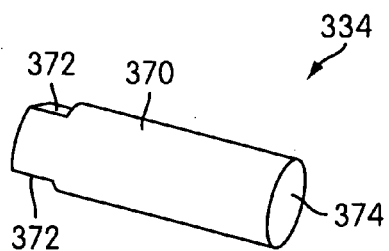
FIG. 14 is a perspective view of a locking pin according to certain embodiments of the present invention.

FIG. 14 is a perspective view of a locking pin according to certain embodiments of the present invention. Locking pin 334 is defined by a substantially-cylindrical pin body 370 having two flats 372 disposed on one end thereof and a locking nub 374 on the opposite end thereof. The locking nub 374 can be employed to impinge on the end of a fastener inserted in the central hole 332 of the captive nut 310 in order to capture the fastener securely within the captive nut 310. For example, in applications wherein a threaded fastener engages a threaded captive nut 310, the locking nub 374 may be positioned to interfere with, and thereby prevent, any rotary motion of the threaded fastener with respect to the captive nut 310.

Figure 15:
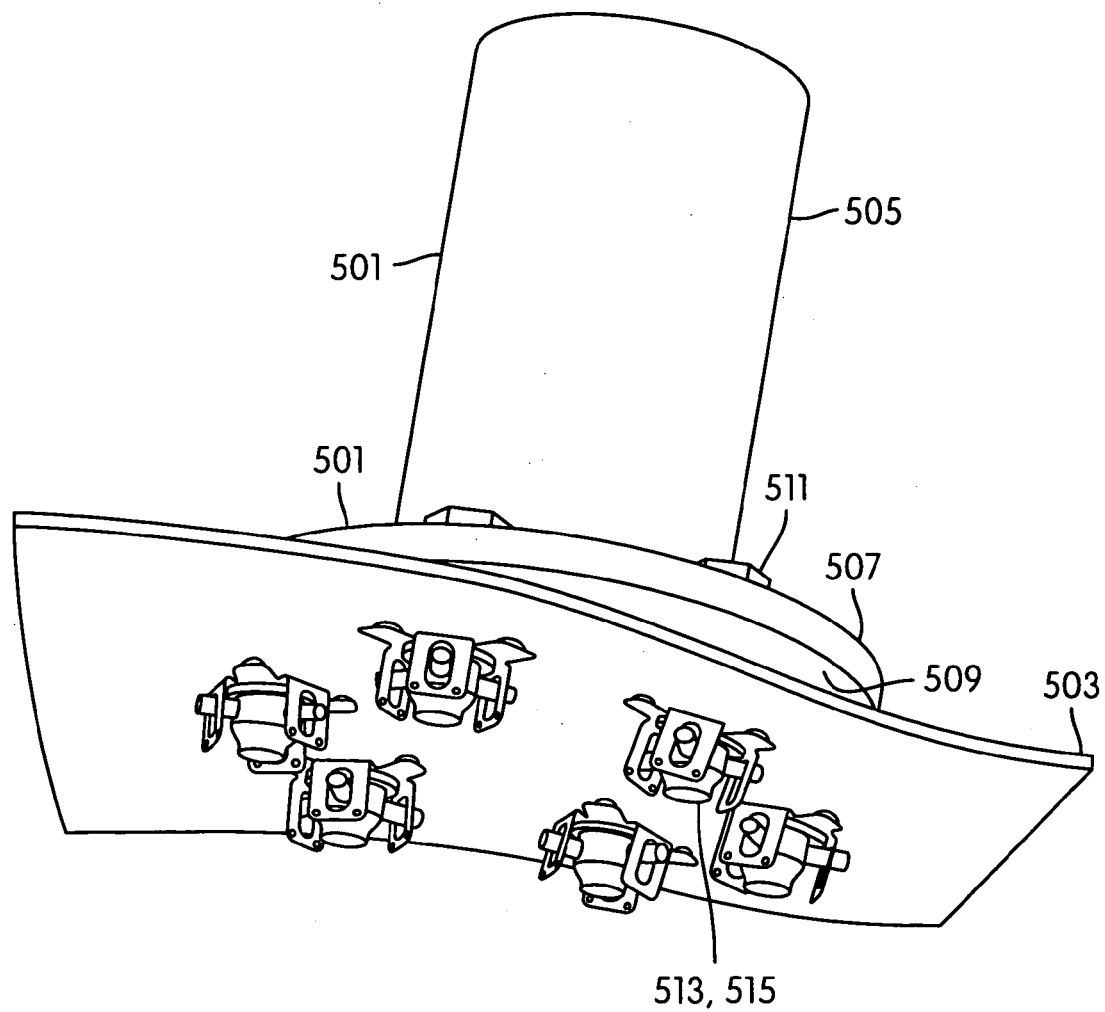
FIG. 15 is a perspective view illustrating a use of a nut plate according to the present invention.
Figure 16:
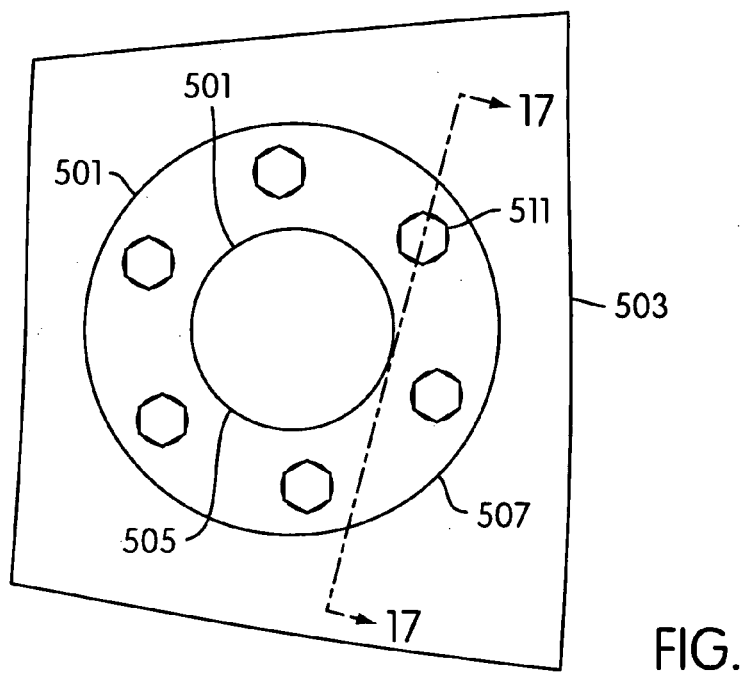
FIG. 16 is a top view of the arrangement of FIG. 15.
Figure 17:
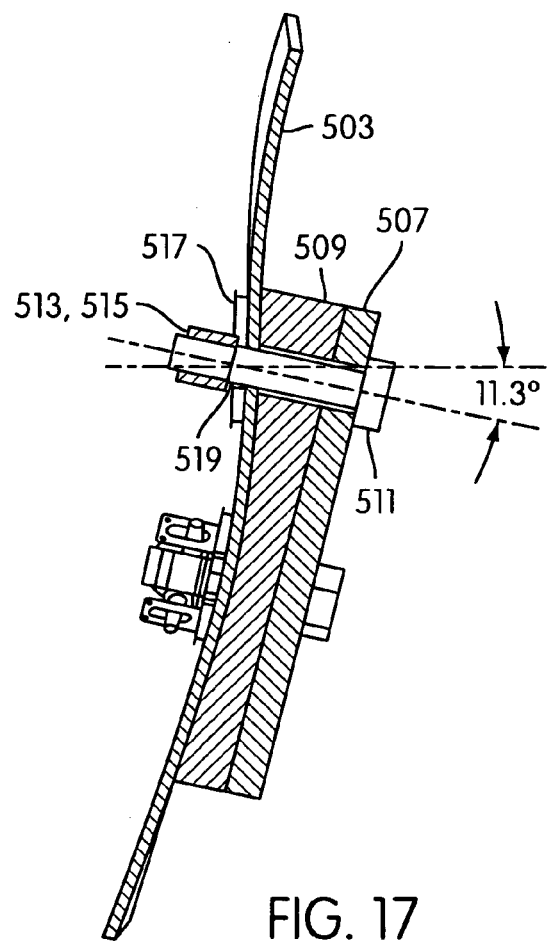
FIG. 17 is a sectional view taken along line 17-17 of FIG. 16.

Referring now to FIGS. 15–17, there is illustrated the use of a nut assembly according to the present invention to connect a component 501 to a complexly contoured panel 503. Component 501 includes a tubular member 505 and a planar flange 507. In the manner well known to those skilled in the art, flange 507 includes a plurality of bolt holes. A component sub-base 509 is disposed between flange 507 and panel 503. Sub-base 509 has a flat top surface and a bottom surface that is contoured to match the contour of panel 503.

A plurality of bolts 511 pass through holes in flange 507, sub-base 509 and panel 503. Each bolt 511 is threadedly engaged with a nut assembly 513. Each nut assembly 513 is of the type described with reference to FIGS. 10–14. As illustrated in FIG. 17, nut 515 rotates with respect to nut plate base 517 into axial alignment with bolt 511. The feet of base 517 engage the surface of panel 503. The feet and base 517 may deform to the contoured surface upon installation, thereby eliminating the need for shimming. Nut plate washer 519 allows nut 515 to float under loaded conditions.

Although preferred embodiments of the invention have been described in detail, it will be understood by those skilled in the art that various modifications can be made therein without departing from the spirit and scope of the invention as set forth in the appended claims.

What is claimed is:

1. A nut assembly, which comprises:
   a base plate, said base plate including a bearing surface with a bore for the passage of a bolt therethrough, said base plate having three foot members disposed around the bore of the base plate, including a plurality of said foot members extending away from said base plate on an opposite side of the base plate as the bearing surface of the base plate, wherein a fastener hole extends through each of the plurality of said foot members; and
   a nut, said nut including a bearing surface engaged with the bearing surface of the base plate, and said nut including a bore engageable with a bolt passing through the bore of the base plate,
   wherein the fastener holes extend through each of the plurality of said foot members in a direction that is substantially parallel to a direction of the bore for the passage of the bolt therethrough.

2. The nut assembly as claimed in claim 1, including each of said three foot members extending away from said base plate on an opposite side of the base plate as the bearing surface of the base plate.

3. The nut assembly as claimed in claim 2, wherein said foot members are equidistant from the bore of the base plate.

4. The nut assembly as claimed in claim 3, wherein said foot members are disposed substantially at the corners of an equilateral triangle.

5. The nut assembly as claimed in claim 1, wherein said foot members are deformable.

6. The nut assembly as claimed in claim 1, including a cage affixed to said base plate to hold said nut in engagement with said base plate.

7. The nut assembly as claimed in claim 6, wherein said nut includes a second bearing surface engaged with said cage.

8. The nut assembly as claimed in claim 7, wherein said cage includes a bearing surface engaged with the second bearing surface of the nut.

9. The nut assembly as claimed in claim 1, including means for limiting rotation of said nut with respect to said base plate about an axis parallel to the bore of the nut.

10. The nut assembly as claimed in claim 9, wherein said means for limiting rotation of said nut includes at least one member extending outward from said nut in a direction perpendicular to the bore of said nut, said member being engageable with said base plate.

11. The nut assembly as claimed in claim 1, wherein the bearing surfaces of said nut and said base plate are spherical.

12. The nut assembly as claimed in claim 1, wherein said bore of said nut is threaded.

13. The nut assembly of claim 1, wherein the three foot members are spaced from each other.

14. A nut assembly, which comprises:
    a generally triangular base plate, said base plate having a central bore, said base plate including a spherical bearing surface disposed around said central bore;
    a foot member disposed at each corner of said base plate, each foot member extending away from said base plate on an opposite side of the base plate as the spherical bearing surface of the base plate;
    a fastener hole extending through at least one of the foot members, the fastener hole being constructed and arranged for the passage of a fastener therethrough; and,
    a nut including spherical bearing surface engaging the spherical bearing surface of the base plate, and said nut including a threaded bore,
    wherein said base plate includes three upstanding members, said upstanding members being disposed intermediate the corners of said base plate, and
    wherein the nut assembly includes at least one pin extending outward from said nut into engagement with at least one of said upstanding members to resist rotation of said nut about an axis defined by the bore of said nut.

15. The nut assembly as claimed in claim 14, including a foot member at each corner of said base plate.

16. The nut assembly as claimed in claim 15, wherein said base plate is equilateral.

17. The nut assembly as claimed in claim 14, including means for retaining said the bearing surface of the nut in engagement with the bearing surface of the base plate.

18. The nut assembly as claimed in claim 17, wherein said retaining means includes a locking ring supported by said base plate and engaged with said nut.

19. The nut assembly as claimed in claim 17, wherein said retaining means includes a cage supported by said base plate and engaged with said nut.

20. The nut assembly as claimed in claim 14, including a retaining member supported by said upstanding members in engagement with said nut to retain said nut in engagement with said bearing surface of said base plate.

21. The nut assembly as claimed in claim 20, wherein said nut includes an upper bearing surface in engagement with said retaining member.

22. The nut of claim 14, further comprising a fastener extending through the fastener hole.

23. A nut assembly, which comprises:
    a generally triangular base plate, said base plate having a central bore, said base plate including a spherical bearing surface disposed around said central bore;
    a foot member disposed at each corner of said base plate, each foot member extending away from said base plate on an opposite side of the base plate as the spherical bearing surface of the base plate;
    a fastener hole extending through at least one of the foot members, the fastener hole being constructed and arranged for the passage of a fastener therethrough; and
    a nut including spherical bearing surface engaging the spherical bearing surface of the base plate, and said nut including a threaded bore,
    wherein said base plate includes three upstanding members, said upstanding members being disposed intermediate the corners of said base plate, and
    wherein the nut assembly includes three pins extending outward from said nut, each of said pins being engaged with an upstanding member to resist rotation of said nut about an axis defined by the bore of said nut.

24. The nut assembly as claimed in claim 23, wherein each of said upstanding members includes an enclosed slot engaging a pin.

\* \* \* \* \*